United States Patent
Shah et al.

(10) Patent No.: US 8,736,619 B2
(45) Date of Patent: May 27, 2014

(54) METHOD AND SYSTEM FOR LOAD OPTIMIZATION FOR POWER

(75) Inventors: Tushar Shah, Orlando, FL (US); Rashad Oreifej, Orlando, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 456 days.

(21) Appl. No.: 12/839,962

(22) Filed: Jul. 20, 2010

(65) Prior Publication Data

US 2012/0019542 A1    Jan. 26, 2012

(51) Int. Cl.
*G06F 9/46* (2006.01)

(52) U.S. Cl.
USPC .......... 345/502; 718/104; 718/102; 718/103; 718/105; 713/320

(58) Field of Classification Search
None
See application file for complete search history.

(56) References Cited

U.S. PATENT DOCUMENTS

| | | | |
|---|---|---|---|
| 5,452,401 A | 9/1995 | Lin | |
| 7,254,812 B1 * | 8/2007 | Menezes | 718/102 |
| 8,087,029 B1 * | 12/2011 | Lindholm et al. | 718/105 |
| 2005/0228967 A1 | 10/2005 | Hirairi | |
| 2006/0053189 A1 * | 3/2006 | Mantor | 708/490 |
| 2006/0282646 A1 | 12/2006 | Dockser | |
| 2007/0074054 A1 | 3/2007 | Chieh | |
| 2007/0234077 A1 | 10/2007 | Rothman et al. | |
| 2008/0184256 A1 * | 7/2008 | Felter et al. | 718/105 |
| 2008/0189524 A1 | 8/2008 | Poon et al. | |
| 2009/0249094 A1 | 10/2009 | Marshall et al. | |
| 2009/0328055 A1 | 12/2009 | Bose et al. | |
| 2010/0037038 A1 | 2/2010 | Bieswanger et al. | |
| 2010/0174923 A1 | 7/2010 | Houlihan et al. | |
| 2011/0055838 A1 * | 3/2011 | Moyes | 718/102 |
| 2012/0013627 A1 | 1/2012 | Shah et al. | |

FOREIGN PATENT DOCUMENTS

| | | |
|---|---|---|
| CN | 103080899 A | 5/2013 |
| JP | 2013-532855 A | 8/2013 |
| WO | WO 2005/088443 A2 | 9/2005 |
| WO | WO 2009/091369 A1 | 7/2009 |
| WO | WO 2009/120427 A1 | 10/2009 |
| WO | WO 2012/009252 A1 | 1/2012 |

OTHER PUBLICATIONS

Fung, Wilson W.L., et al., "Dynamic Warp Formation: Eddicient MIMD Control Flow on SIMD Graphics Hardware," in *ACM Trans. Archit. Code Optim.* 6(2):1-37 (Jun. 1, 2009).
International Search Report and Written Opinion for International Application No. PCT/US2011/043509, European Patent Office, Netherlands, mailed on Jan. 31, 2012 (19 pages).

* cited by examiner

*Primary Examiner* — Xiao Wu
*Assistant Examiner* — Greg Raburn
(74) *Attorney, Agent, or Firm* — Sterne, Kessler, Goldstein & Fox P.L.L.C.

(57) ABSTRACT

A method for managing work distribution in a processor including a plurality of instruction data modules, is provided. The method includes analyzing work units received by the processor and comparing the utilization level in each active module within the plurality with a first predetermined threshold. The work units are distributed across selected ones of the modules within the plurality based upon the analyzing and the comparing.

21 Claims, 7 Drawing Sheets

|  | LBound | UBound | SIMD (%) Increment |
|---|---|---|---|
| 1 | 00 | 20 | -70% |
| 2 | 21 | 50 | -40% |
| 3 | 51 | 70 | -20% |
| 4 | 71 | 90 | 0% |
| 5 | 91 | 95 | 30% |
| 6 | 96 | 100 | 50% |

FIG. 3

METHOD AND SYSTEM FOR LOAD OPTIMIZATION FOR POWER

BACKGROUND OF THE INVENTION

1. Field of the Invention

The present invention generally relates to load-balancing in graphics processing systems.

2. Background Art

Conventional graphics processing systems, such as graphics processing units (GPUs), include a number of interrelated modules to perform critical image processing functions. These modules combine to form, as understood to those of skill in the art, a graphics pipeline. Included within this pipeline, is a shader engine.

A single graphics pipeline can include many shader engines. Traditionally, the shader engine is responsible for providing texture to three dimensional images for display on a monitor. One of the critical components within each shader engine is a single instruction stream multiple data-stream (SIMD) module. SIMD modules (or simply SIMDs) are used to perform one operation on multiple sets of data, and they handle the majority of the workload within the shader engine. Each SIMD processes a portion of the workload within each shader engine. Therefore, a task of critical importance to maximizing efficiency and throughput within the shader engine is determining how to distribute the workload across SIMDs.

A common assumption is that shader engine performance will increase with a corresponding increase in the number of SIMDs. This statement is only true, however, in limited circumstances, such as during heavy workload conditions. For a less heavy load scenario, which is frequently the case, the performance of the shader engine may not necessarily increase as the number of SIMDs increases. In these situations, if all the SIMDs are enabled, power is wasted because underutilized SIMDs (i.e., SIMDs with lighter or no workloads) remain enabled and active.

Conventional graphics systems simply divide the workload across all of the SIMDs within the shader engines used for a particular operation. This approach, however, is extremely power-inefficient. The inefficiency occurs because there is no determination of whether fewer SIMDs could be used to perform the operation without compromising system performance. Thus, conventional systems keep all of the SIMDs within the shader engine active regardless of whether they are required to perform the operations.

As noted above, when SIMDs are enabled, they consume power. Even in an idle state, SIMDs still consume a minimal, but measurable, amount of power. Thus, keeping all available SIMDs enabled, even if unused or underutilized, wastes power. It would also be beneficial to be able to compact the workload in as minimum number of SIMDs as possible. This approach reduces unnecessary overhead of presenting the workload to every available SIMD.

Workloads can also be problematic for conventional graphics systems in other ways. For example, the problems of an unpredictable, or improperly distributed, workload can be exacerbated by the chips instantaneous rate of current change (di/dt). In the absence of workload within a conventional graphics core, the chip consumes a certain amount of current. If the workload suddenly surges, however, the chip begins to drive more current. If the workload arrives in total (i.e., at once or over a very short period of time), the core goes from idle to completely busy. Correspondingly, the current will also go from minimum to maximum in a short amount of time causing a severe di/dt effect. Ideally, di/dt should be as small as possible.

What are needed, therefore, are methods and systems to determine the current and future utilization of each SIMD, activate the SIMDs in accordance with this determination, and distribute the workload to the activated SIMDs. What are also needed are methods and systems to reduce the negative effects of di/dt.

BRIEF SUMMARY OF EMBODIMENTS OF THE INVENTION

The present invention meets or addresses in part the above-described needs. For example, in one embodiment of the present invention, workload within the shader engine is distributed in a manner that maximizes system performance and reduces power consumption.

More specifically, embodiments of the present invention provide a load balancing per watt technique (LBPW). In one implementation, this LBPW technique monitors the number of arithmetic logic unit (ALU) instructions and fetch instructions executed within each SIMD. Additionally, newly assigned thread loads (i.e. wavefronts) are queued and are monitored. This monitoring is used to assess current and future utilization of the SIMDs. Under this scheme, only SIMDs that are actually needed or predicted to process a given workload within the shader engine, remain activated. SIMDs that are not needed are deactivated. By deactivating unneeded SIMDs, power consumption is reduced. As an additional benefit, the embodiments of the present invention improve performance per watt without significantly compromising system performance.

In yet another embodiment of the present invention, di/dt within the graphics chip is reduced to increase reliability and improve frequency at lower voltages. Such reduction affects bill of materials and permits the use of cheaper components.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIG. 3 is an illustration of an exemplary programmable lookup table for assessing SIMD activity in accordance with embodiments of the present invention;

DETAILED DESCRIPTION OF EMBODIMENTS OF THE INVENTION

Embodiments of the present invention enable substantially improved utilization of video processor resources. While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The compute power of a graphics processor is derived from its math unit. The math unit is made up of Arithmatic Logical Units (ALUs) to perform integer, logical, and single/double precision floating point operations. The graphics processor includes an array of such math units to achieve higher performance. Such an array is known as a unified shader core, which includes a scalable shader pipeline. To achieve higher performance, a configuration can be built by having multiple shader pipelines. The shader pipelines are structured as an array of Quad Pipes (QP) and SIMD modules.

Figure 1A:
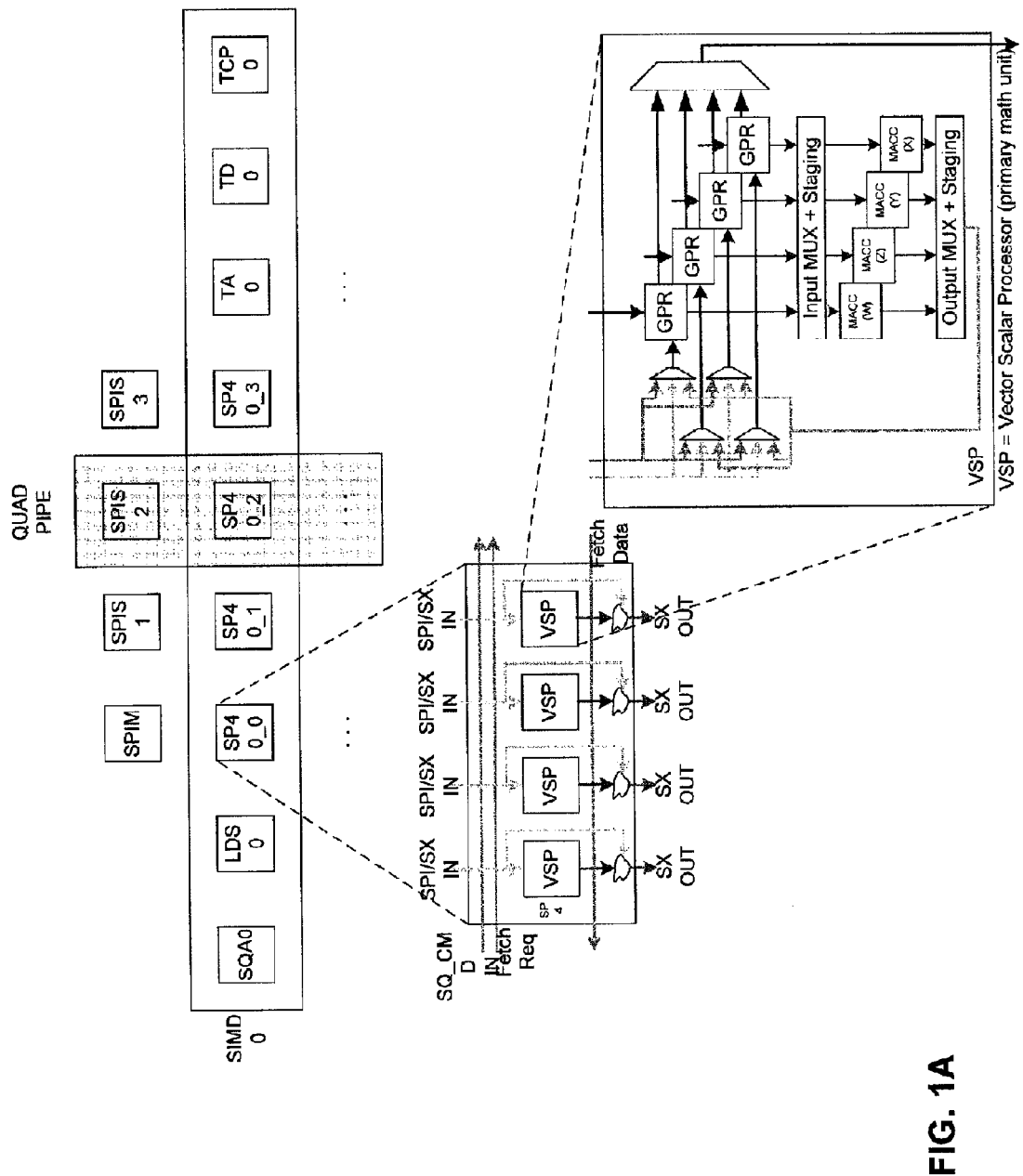
FIG. 1A is a block diagram illustration of exemplary quad pipe and SIMD structures constructed in accordance with an embodiment of the present invention.
Figure 1B:
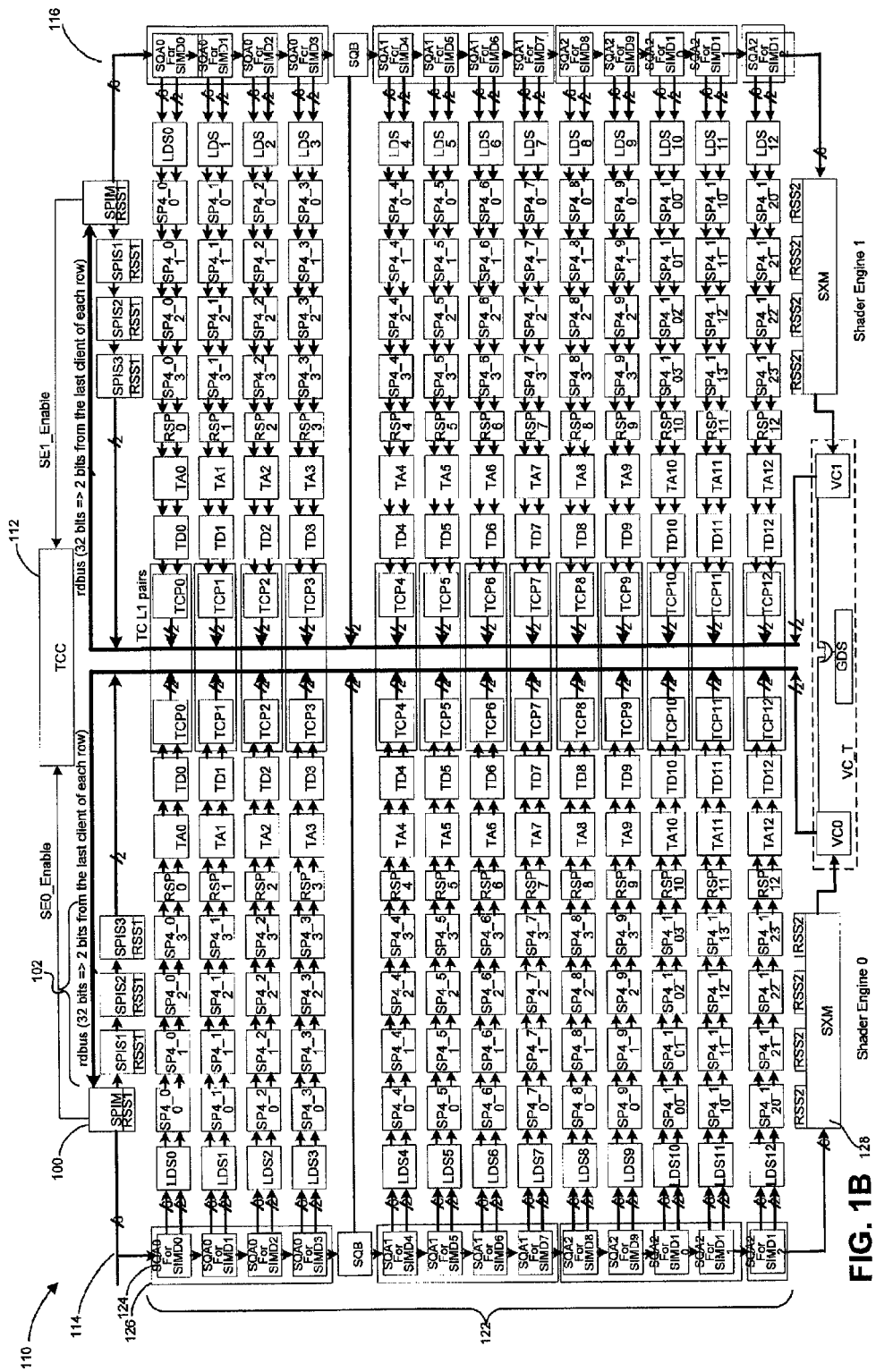
FIG. 1B is a block diagram illustration of an exemplary shader core constructed in accordance with an embodiment of the present invention.

The SIMDs provide mathematical horse power to the graphics system. Details of the shader core and the SP, within the context of embodiments of the present invention, are illustrated in FIG. 1B, and discussed below. FIG. 1A, however, is an illustration of one exemplary approach for providing this mathematical horse power in accordance with embodiments of the present invention. The present invention, however, is not limited to this particular approach.

By way of example, FIG. 1A includes an illustration of a shader pipe interpolator master (SPIM) module 100, along with shader pipe interpolator slave (SPIS) modules 102, and a single SIMD 104. The SPIM module 100 controls the operation of the shader engine (discussed in greater detail below). The SPI slave modules 102 are interpolator controllers and manage work items within the shader engine. Additional details of the SIMDs are also discussed more fully below.

A component within the SIMD that is crucial to delivery of the mathematical horse power is the ALU shader pipe controller (SP4). In the illustration of FIG. 1A, a single SP4 (0_2) and an SPIS (2) form a quad pipe 105. The SP4s serve as the scalable central ALU.

Each SP4, such as SP4 (0_0), contains four Vector Scalar Pipes (VSP) 106. Each VSP, such as VSP 108, can perform four scalar operations per clock, 16 scalar operations per instruction and hence total of 64 scalar operations per SP4. The shader units can execute operations on integers, single, half or double precision Institute of Electrical and Electronics Engineers (IEEE) floating point data types.

Instructions are issued to each SP4 of SIMD 104 over four clocks. Each SP4 outputs four data set per clock one each from VSP to a shader export module (discussed below). The VSP is the primary math unit comprising of staging registers, logic, four multiply and accumulate (MACC) units and a transcendental engine. Each VSP also has four sets of General Purpose Registers (GPRs). Each MACC+GPR pair reads operands per clock to execute one scalar operation per clock.

Depending on the mode of operation, a graphics system can have different performance and power requirements. On the fly, control of disabling and enabling of SIMDs can provide great flexibility in achieving the required performance and power for a given application. This in turn optimizes system usage.

Embodiments of the present invention dynamically control the enabling and disabling of SIMDs based upon current and projected workloads, An example of dynamic SIMD control is described in the application entitled "Dynamic Control of SIMDs" (U.S. Patent Application 61/363,856, filed on Jul. 13, 2010, to Shah et al.), which is incorporated herein by reference as though set forth in its entirety. This approach maximizes the utilization of enabled SIMDs, which saves power. If power savings can be achieved with little or no performance degradation, chip efficiency (i.e. performance/watt) will be enhanced. In other words the shader engine produces the same amount of work, but with fewer SIMDs. Disabling the unused SIMDs consequently saves power.

FIG. 1B is a block diagram of an exemplary shader core 110 constructed in accordance with an embodiment of the present invention. The shader core 110 is merely one implementation of a shader. The present invention, however, is not so limited.

In the illustration of FIG. 1, the shader core 110 includes a level 2 texture cache 112, a first shader engine 114, and a second shader engine 116. The first and second shader engines 114 and 116 are essentially functionally identical. Therefore, the detailed discussions that follow, directed to the first shader engine 114, will also apply to the second shader engine 116.

The shader engine 114 includes the SPIM module 100, along with the SPI slave modules 102. The SPI modules 102, as noted above, are interpolator controllers and manage work items, such as wavefronts, within the shader engine 114.

The shader engine 114 also includes a SIMD array 122. Each row in the array 122, such as row 124, represents a single SIMD. Within each SIMD, a shader sequencer (SQ), such as SQ 126, assigns instructions. The SPIM 100 controls the operation of shader engine 114, distributing the wavefronts and the assignments of each of the shader engines to the SQs within the SIMD array 122, such as the SQ 126. In embodiments of present invention, wavefronts represent different level shaders, for example, vertex shader, a pixel shader, and/or a compute shader, etc.

Each SIMD within the array 122 also includes a local data store memory (LDS) controller, ALU SP4, a redundant shader pipe (RSP), a texture addresser (TA), texture data logic (TD), and a texture cache L1 (TCP).

In the embodiment of the present invention illustrated in FIG. 1, when shader commands are received from an upstream vertex grouper tessellator (VGT), each command is analyzed by the SPIM 100. Based upon this analysis, the SPIM 100 assigns wavefronts to the available SIMDs. A determination is also made as to how many SIMDs are available within the array 122 to execute the wavefronts.

By way of example, if the SPIM 100 produces 12 wavefronts and 12 of the SIMDs within the array 122 are available, then based upon the amount of work in each of the 12 wavefronts, the SPIM 100 may assign one wavefront to each of the SIMDs. These wavefronts are assigned through the SQs, which generate threads from the wavefronts and sequences these threads to be executed in the respective SIMDs. Execution of these threads is based on the shader programming instructions. These instructions could be ALU instructions, or texture fetch instructions, or any other type. Logic, constructed in accordance with embodiments of the present invention and addressed in greater detail below, evaluates the SIMD utilization based on type and number of instructions executed in a given time interval. In this manner, work is assigned and executed within the shader engine 114.

The shader engine 114 also includes a shader export (SXM) module 128. The wavefront assignments noted above, along with other computational information, is gathered by the SXM module 128, and transferred to memory.

Embodiments of the present invention, therefore, carefully assess shader engine workload, current SIMD utilization, and future/projected SIMD utilization. Based upon this assessment, SIMDs are enabled or disabled in a manner that distributes the workload across only those SIMDs that are required to process the workload. SIMDs that are not required get their clocks and optionally power disabled thus saving power. This technique creates an optimal balance for the shader engine workload in a manner that achieves the same performance from fewer SIMDs, thus maximizing the performance per watt.

More specifically, the techniques discussed above analyze utilization for each of the active SIMDs for each of the shader engines 114 and 116. The utilization is then matched with values in a look-up table to determine an optimum work load balance scheme, based upon the available SIMDs. If more SIMDs are active than are needed, the unneeded SIMDs can be disabled. On the other hand, if fewer SIMDs are active than are needed, additional SIMDs can be activated. Checks are made during regular user programmable intervals to assess utilization, optimally distribute the workload, and enable and/or disable SIMDs accordingly.

By way of an example, the load balancing techniques of embodiments of the present invention are implemented as micro-code and reside outside of the shader engine 114. These specific techniques reside in the run list controller (RLC) block (not shown) and are executed by a micro-engine. A register interface is provided between the RLC and it's micro-engine and the SPIM 100.

By way of example, during operation, relevant information is passed from various graphics blocks, such as the command processor (state), graphics register bus manager (state), vertex geometry shader (state), SPIM (state & counters) and SQ (counters), to the RLC logic. This relevant information is used by the algorithm for analysis and decision making Once a decision is made, through register interface hardware, for example, appropriate values are programmed and stored within the SPIM 100 by the RLC, which then affects the behavior of shader core execution. The process of "capture", "evaluate", "decide", "execute" continues in a cyclic manner until all work has been completed, resulting in optimal performance per watt.

The present invention, however, is not limited to RLC micro-engine implementation. As will be shown more clearly below, the present invention can be implemented as hardware, software, firmware, or combinations thereof. These implementations can reside any place within the graphics processing system.

Other environments implement the foregoing techniques as hardware. The hardware approach utilizes counters, accumulators, etc. and optimizes flexibility.

Figure 2A:
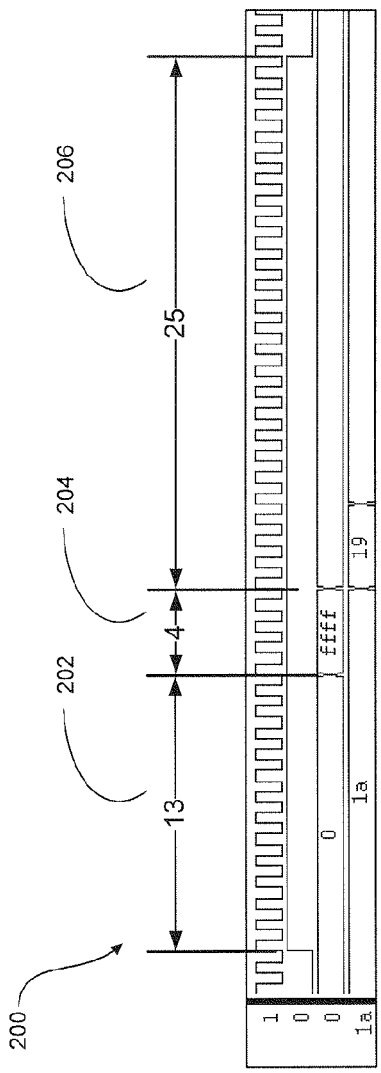
FIG. 2A is a graphical illustration of conventional SIMD load behavior without balancing.

FIG. 2A is a graphical illustration 200 of conventional SIMD load behavior without balancing. Embodiments of the present invention also maximize utilization within individual SIMDs. By maximizing utilization, overhead cycles of the respective SIMDs are reduced, resulting in additional power savings.

When conventional SQ blocks issue instructions to a corresponding SIMD, a busy signal corresponding to that SIMD is transmitted, lasting for typically 13 clock cycles 202. Those 13 cycles are followed by a work cycle 204 of four cycles, and then by an idle or waterfall cycle 206 of 25 cycles. FIG. 2A depicts the example where all the SIMDs in an array (similar to the array 122) are activated, but each SIMD is not fully utilized. In this example, each SIMD will waste 38 overhead cycles (13+25) by merely idling or partially water-falling, as shown in FIG. 2A.

Figure 2B:
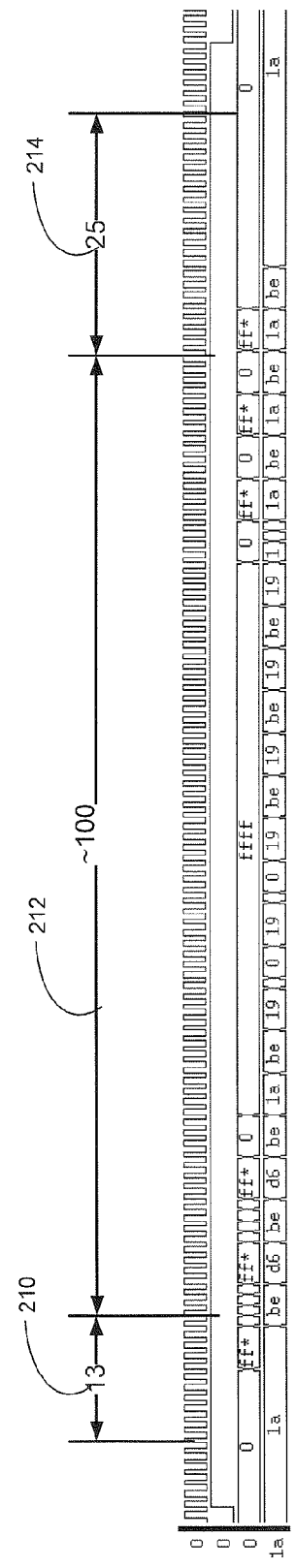
FIG. 2B is a graphical illustration of SIMD load behavior in accordance with an embodiment of the present invention.

The percentage of the overhead cycles, however, is reduced as more instructions are issued to each SIMD, leading to fewer bubbles within the pipeline and hence better utilization. FIG. 2B is an illustration of enhanced utilization in accordance with principles of the present invention.

FIG. 2B is a graphical illustration 208 of SIMD load behavior in accordance with embodiments of the present invention. FIG. 2B depicts the example where only two SIMDs in the array 122 are enabled. In FIG. 2B, however, these two SIMDs are performing the same amount of work that all the available SIMDs were performing in FIG. 2A, above.

In FIG. 2B, under a load scheme that maximizes the utilization of each SIMD, an idle cycle 210 includes 13 cycles. The idle cycle 210 is followed by a work cycle 212 that includes 100 cycles of work. The work cycle 212 is followed by an idle cycle 214 lasting 25 cycles.

In FIG. 2B, 38 overhead cycles are still wasted, but they are only wasted in two SIMDs instead for each of the available SIMDs of that array. Furthermore, the issuance of instructions back to back utilizes waterfall cycles to compact the execution of preceding instructions. These two factors combined greatly improve the effective utilization cycles for active SIMDs. Thus, the utilization arrangement of FIG. 2B performs the same amount of work, provides the same level of performance, but consumes significantly less power. As shown in the exemplary embodiment of FIG. 2B, maximizing the utilization of each enabled SIMD saves power. If the power savings can occur without degrading overall performance, chip efficiency (i.e. performance/watt) will increase.

Figure 3:
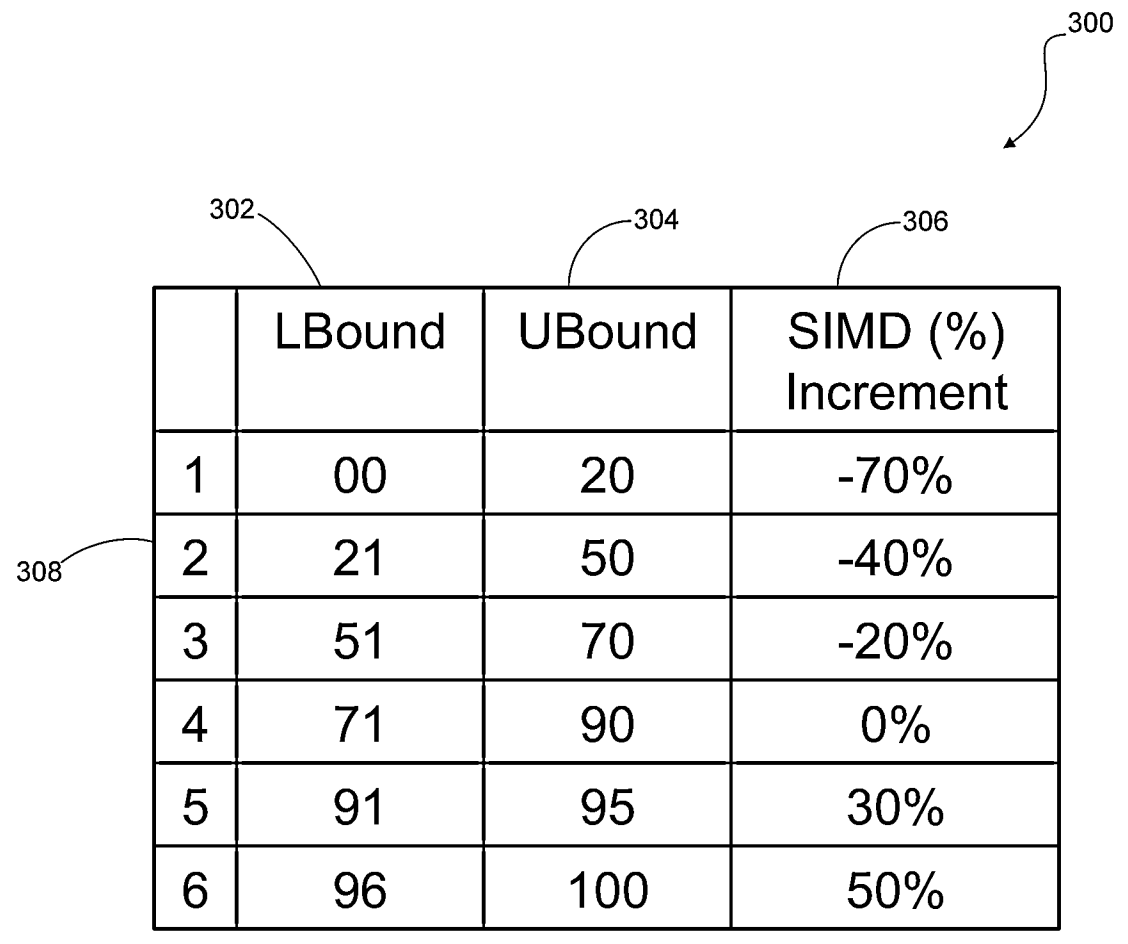

FIG. 3 is an illustration of a simplified programmable lookup table 300 used to assess SIMD utilization in accordance with an embodiment of the present invention. In the embodiments of the present invention, SIMD utilization level is measured by counting instructions issued by the SQ for each SIMD over a predetermined period of time.

Using the exemplary approach of counting instructions, a quantitative measure for a particular SIMD's utilization can be inferred. This process is performed for each of the SIMDs within the array 122 and the results are averaged over the predetermined period of time. Averaging across the enabled SIMDs over the predetermined period gives a fair approximation of the total utilization of each of the enabled SIMDs. The averaged utilization numbers are then compared with values in the lookup table 300. Depending upon the lookup table values, a determination is made to enable additional SIMDs, or disable currently active SIMDs for an optimal utilization level.

Embodiments of the present invention relate to utilization of SIMDs in their present state and also include projections regarding the SIMD's future state. Each SIMD executes multiple types of instructions that are categorized into two parts: (a) texture fetch related and (b) ALU related instructions. Thus, using the techniques of the present invention, a dedicated combination of hardware and firmware controller, monitors and measures execution of ALU instructions and fetch instructions within each SIMD.

For current utilization, information related to ALU and fetch instructions is captured and calculated dynamically in each SIMD on clock by clock basis. That is, over a predetermined period of time, the number of ALU instructions and fetch instructions that are executed in each SIMD are counted. This number is representative of the current utilization/SIMD. While the ALU and fetch instructions are being counted in each SIMD, other activities like wavefront and thread allocations that are occurring in the pipeline, are queued for execution within the SIMD during future cycles.

These wavefront and thread queues, for example, can reside within the SPI modules 102 and/or within the SQs respectively, since both of these modules play a role in buffering workload. As noted above, the SPI modules 102 generate wavefronts based upon shader type. For a given shader type, for example, the SPI modules 102 will indicate that for a particular SIMD, a specific type of wavefront is to be executed. Multiple threads get generated from each wavefront inside SQ.

The information above is compared with entries in the table 300. The table 300, is just an illustration of the possible implementation of the delta table. This table 300, for example, includes utilization lower bounds 302, utilization upper bounds 304, and SIMD % increment (delta) 306. The SIMD % increment 306, for example, can be positive or negative (i.e., indicating to decrement). By using predetermined tabulated values, such as those in the table 300, SIMD utilization is assessed and compared with available ranges. This comparison is then used to determine whether there is a need to enable more SIMDs or disable few of the active SIMDs.

Projections and assessments can also be made regarding future SIMD operations when deciding how many SIMDs are needed to perform work. While the embodiments discussed above focus on ALU and fetch instruction, the present invention is not so limited. Other types of instructions can also be used to determine SIMD utilization, like Vector ALU, Scalar ALU, Texture Fetch, LDS and other miscellaneous.

In the table 300, if at a certain point of runtime, there have been 20 (as an example) SIMDs enabled over the evaluation period, the utilization number comes out to be 30%. This number falls within range 308; FIG. 1 has 13 SIMDs per SE and there are 2 SEs, hence there are total of 26 SIMDs in the illustrated system). Hence, the action taken by the controller will be to disable 40% of the enabled SIMDs according the "SIMD (%) Increment" column. As a result 8 SIMDs (20 active SIMDs*40% reduction) will be shut off to coerce the core to pack more wavefronts into the remaining 12 SIMDs in an effort to attain higher utilization as discussed earlier without any substantial performance impact. The controller will keep on monitoring the system utilization and gracefully adapt the enabled resources to suit the on coming workload. In the above example the controller will push the system to converge at range "4" where each enabled SIMD is (80-90%) utilized. Moreover, by tuning the evaluation period length and the delta table values, the controller action's granularity can be varied to suit the real world applications.

Figure 4:
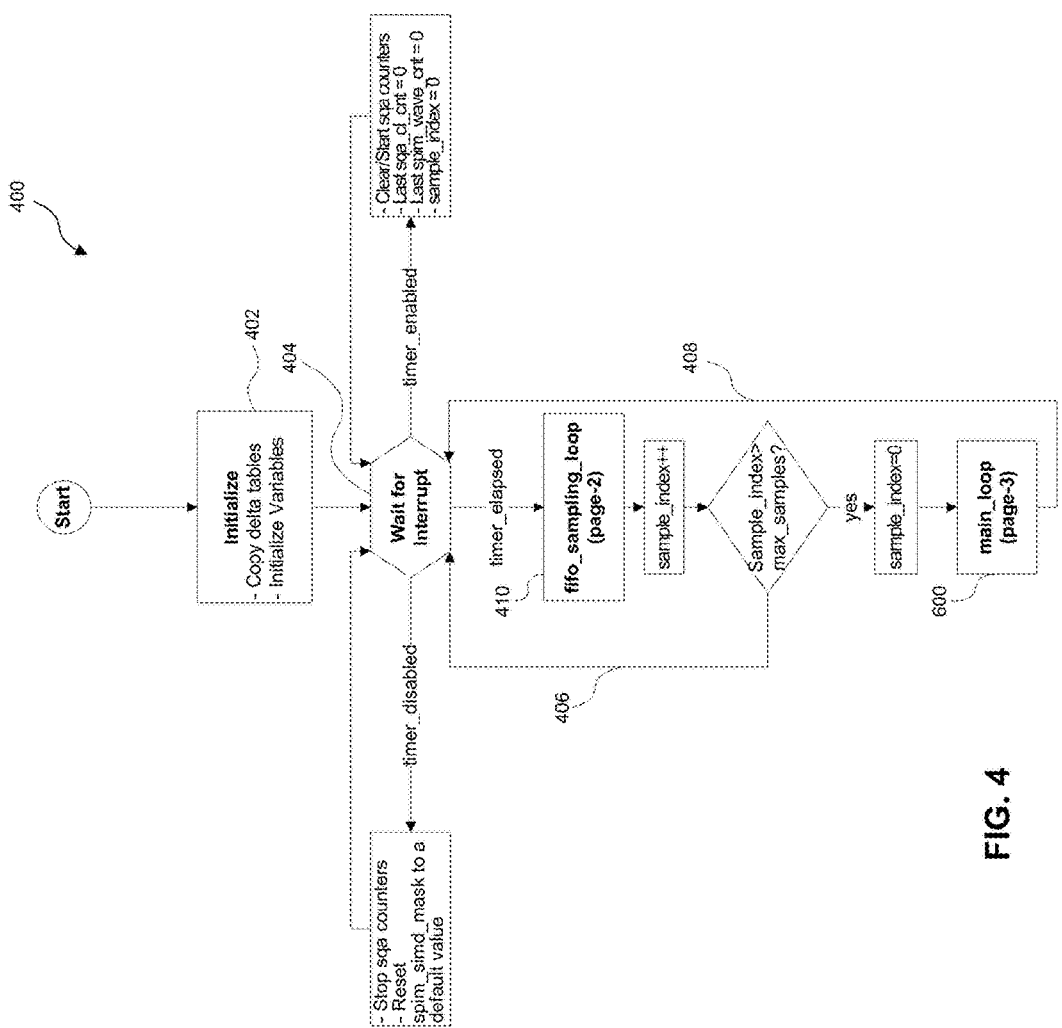
FIG. 4 is an exemplary flowchart of an exemplary method for performing SIMD load-balancing, in accordance with the present invention.

FIG. 4 is an exemplary flowchart of a method 400 implementing SIMD load-balancing, in accordance with an embodiment of the present invention. In FIG. 4, initialization begins at step 402. In step 402, the chip comes out of reset and the table 300 is initialized in accordance with ALU and fetch instruction count values. This can occur, for example, within scratch memory registers of the RLC. The table 300 divides the utilization range of (0-100%) into smaller intervals and specifies the number of SIMDs to be activated or deactivated for a particular utilization interval.

Figure 6:
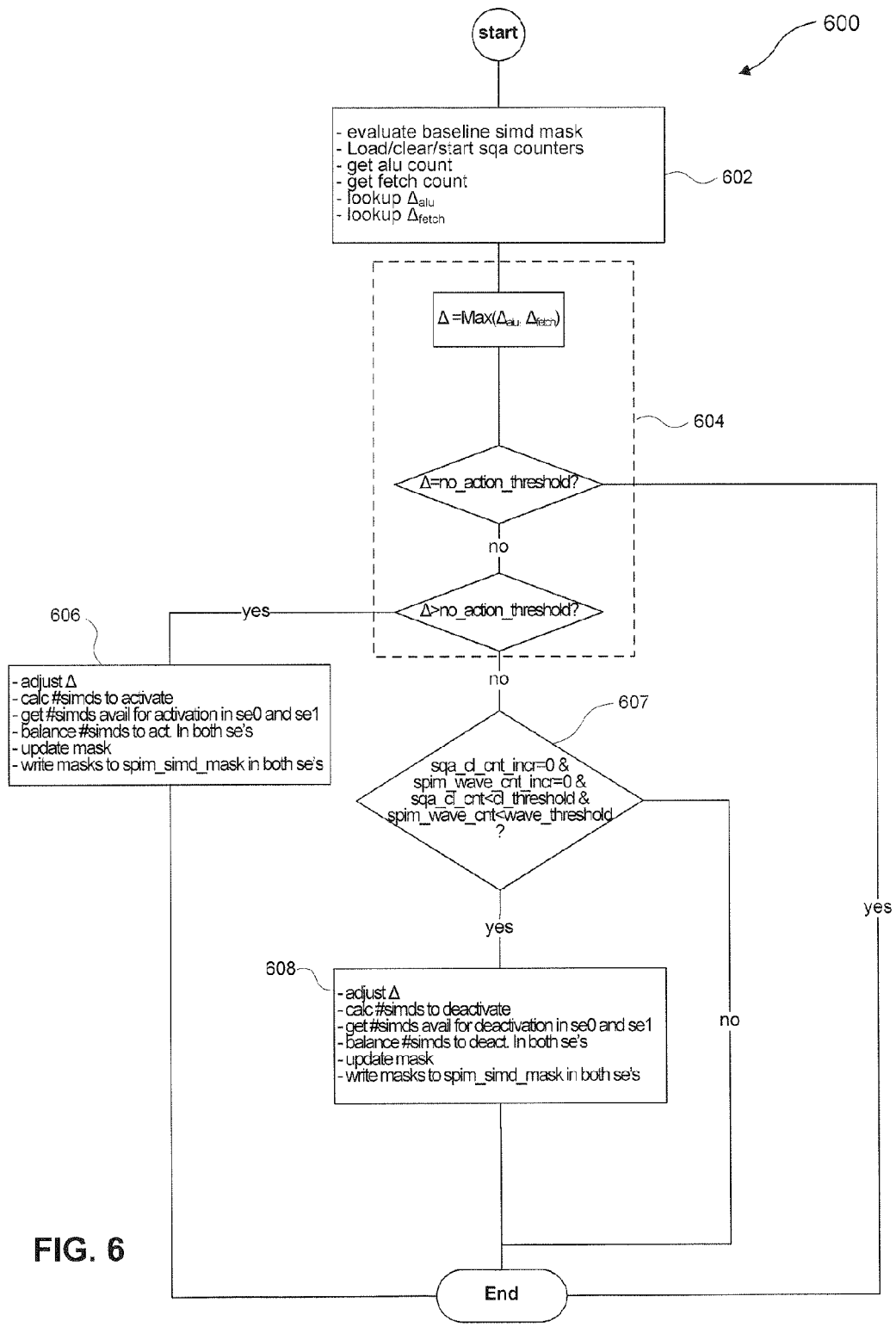
FIG. 6 is a more detailed flowchart of method steps shown in FIG. 4.

In step 404, an interrupt wait occurs. In an inner loop (i.e., fast loop) 406, the pending wavefronts and thread counts are sampled. This is done through FIFOs within the SPI modules 102 representing pending wavefront counts and the SQ FIFOs representing pending thread counts can be sampled out to extract SIMD future projection data. This data can be analyzed to determine whether trends indicate that SIMD utilization may increase or decrease. A predetermined number of samples, for example 10, can be taken and parameterized. Once the number of samples reaches the predetermined maximum number, the process transitions to a main loop 600. Additional details of an exemplary main loop 600 are illustrated in FIG. 6 and will be discussed below.

Returning to FIG. 4, after the inner loop 406 and the main loop 600 conclude, the method 400 returns along a path 408 to the interrupt step 404. As part of inner loop 406, a sampling step 500 of FIG. 5 is executed.

Figure 5:
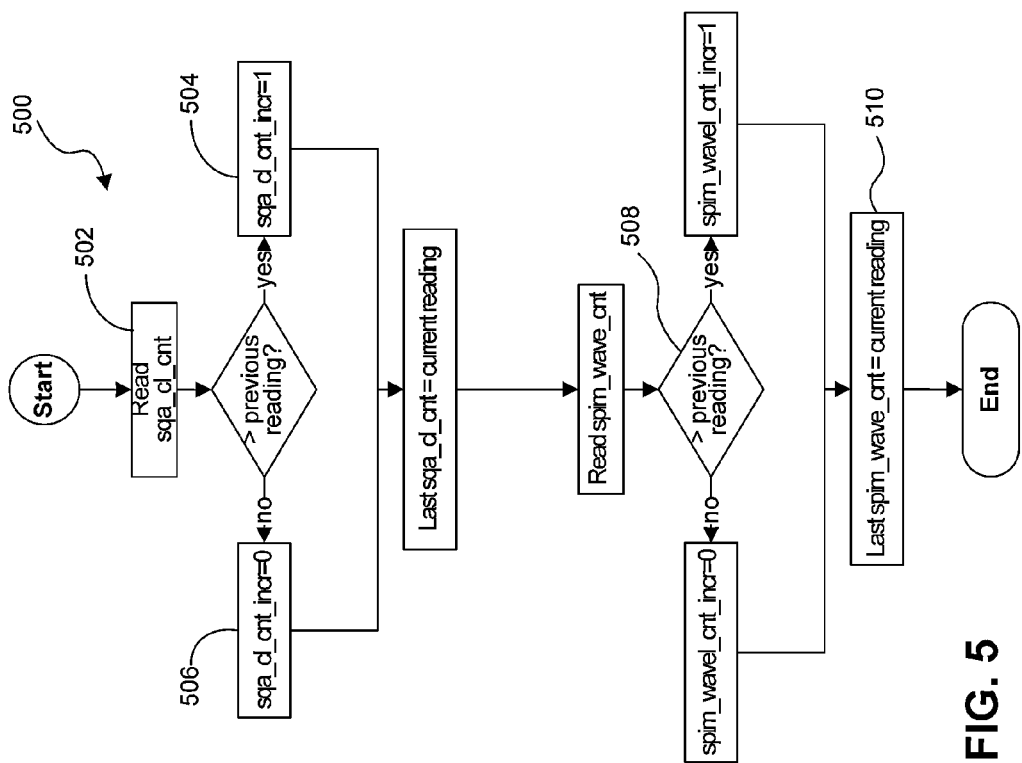
FIG. 5 is a more detailed flowchart for performing first in first out (FIFO) sampling shown in FIG. 4.

FIG. 5 is a flowchart of an exemplary method 500 for performing FIFO sampling. The FIFO sampling method 500, for example, samples the number of entries in the FIFOs and determines future trends by performing trend data mining noted above. This trend data is used as a secondary factor to assess SIMD utilization. In the method 500, a SQ is read in step 502 to show pending threads for each SIMD within the array 122. This data is compared to determine whether it was more (step 504) or less (step 506) than a previous reading 508, to determine trend. If the trend is up (e.g., by comparing with data from the SPIM 100), an up flag may be set. If smaller, another flag (down) can be set. This data is stored as a last reading 510.

As noted above, trend is one factor used to determine the optimal number SIMDs required for a given work load. For example, if current utilization is zero, but projected future utilization is 30%, 90% of the SIMDs could be deactivated. On the other hand if current utilization is zero, but future trend is indicating 80% more work, then 90% of the current SIMDs cannot be deactivated without compromising performance and hence SIMDs are not reduced even though the current utilization is very low.

FIG. 6 is a more detailed flowchart of the main loop step 600, shown in FIG. 4. The method 600 gathers data from other steps and uses this data to execute essential decisions with the SIMD utilization determination process. In step 602, among other things, an evaluation is made of the number of SIMDs that are enabled. This number is not fixed and can depend, for example, on harvesting or defect tolerance or deliberate intent of reduced configuration.

More specifically, in step 602, for each of the shader engines 114 and 116, the system establishes a baseline of the SIMDs that are good to be included in the optimization process. If any shader type is limited to a subset of SIMDs rather than all SIMDs, that subset is removed from the baseline SIMD mask and is not considered in the optimization process.

In step 604, the following exemplary operations are performed:

$$\begin{cases} 0 \leq \Delta \leq 63 & \text{deactivate} \quad \# \, simds = \dfrac{(64-\Delta)}{64} * active\_simds \\ \Delta = 64 & \text{no action} \quad \# \, simds = 0 \\ 65 \leq \Delta \leq 127 & \text{activate} \quad \# \, simds = \dfrac{(\Delta-64)}{64} * active\_simds \end{cases}$$

In the step 604 a baseline delta max tells algorithm to enable or disable. Next, the delta value that corresponds to the ALU count, is looked up. The delta value represents the percentage of SIMDs relative to the number of currently active SIMDs that have to be activated/deactivated to balance the load. Delta has a value from 0-127. To be conservative, larger delta values can be chosen which promote activating more SIMDs, or as a minimum, deactivating fewer SIMDs.

If delta is above the neutral threshold and more SIMDs are to be activated, the number of SIMDs is calculated and is balanced between the available shader engines. If the delta is below a neutral threshold and more SIMDs are to be deactivated, an extra (secondary) determination is made to ensure the future load has enough SIMDs by checking the workload trend as well as state of pending workload queues. If the wavefront count and clause (threads) count, for example, are showing decreasing or steady trends and are reported as below thresholds, then the deactivation can occur. If either one shows an incrementing trend or is reporting above threshold, then no deactivation is done and is left for the next iteration to clear up.

If delta in step 604 exceeds a predetermined threshold, step 606 is implemented. In step 606, the number of SIMDs to be activated is determined and applied. If delta in step 604 is less that the predetermined threshold, the technique proceeds to step 607. In step 607, a decision is made to decrement number of SIMDs based on factors described before and an action is taken if necessary in step 608. Step 608 is similar to step 606, and will therefore, not be discussed in additional detail.

The LBPW techniques discussed above can also help reduce the negative effects of di/dt. Consequently, noise margins for the voltage regulator can be improved which allows use of low cost regulators. If current changes too fast, frequency will need to be reduced to compensate. Frequency reduction will result in reduced performance. If di/dt is reduced, then frequency can be increased, resulting in increased performance. Reduction in di/dt can also allow reduced VDDC operation resulting in lower dynamic power consumption.

An additional benefit of embodiments of the present invention is the facilitation of maximum performance per watt for a given thermal design power (TDP) plan. The shader compute horse-power can be adjusted as per TDP clamping. One exemplary approach for achieving this includes bounding box. As understood by those of skill in the art, bounding box is a technique used when defining operating conditions of the chips during binning process. A chip, for example, can have different operating configurations resulting in different market SKUs. Each SKU has a bounding box for TDP. All of the different variations in the market SKUs have different TDP values (bounding box for SKU). The LBPW technique of the present invention helps achieve best performance per watt for a given bounding box.

CONCLUSION

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

For example, various aspects of the present invention can be implemented by software, firmware, hardware (or hardware represented by software such, as for example, Verilog or hardware description language instructions), or a combination thereof. After reading this description, it will become apparent to a person skilled in the relevant art how to implement the invention using other computer systems and/or computer architectures.

It should be noted that the simulation, synthesis and/or manufacture of the various embodiments of this invention can be accomplished, in part, through the use of computer readable code, including general programming languages (such as C or C++), hardware description languages (HDL) including Verilog HDL, VHDL, Altera HDL (AHDL) and so on, or other available programming and/or schematic capture tools (such as circuit capture tools) and/or any other type of CAD tools.

This computer readable code can be disposed in any known computer usable medium including semiconductor, magnetic disk, optical disk (such as CD-ROM, DVD-ROM) and as a computer data signal embodied in a computer usable (e.g., readable) transmission medium. As such, the code can be transmitted over communication networks including the Internet and intranets. It is understood that the functions accomplished and/or structure provided by the systems and techniques described above can be represented in a core (such as a GPU core) that is embodied in program code and can be transformed to hardware as part of the production of integrated circuits.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What we claim is:

1. A method comprising:
   analyzing work units received by, a processor;
   determining a current utilization level of active instruction data modules of a plurality of instruction data modules;
   determining a first trend based on wavefront counts of the active instruction data modules;
   determining a second trend based on thread counts of the active instruction data modules;
   comparing the current utilization level of active instruction data modules with threshold values; and
   distributing the work units across selected ones of the plurality of instruction data modules based upon the analyzing, the current utilization level, the first trend, the second trend, and the comparing.

2. The method of claim 1, wherein the comparing includes determining whether the current utilization level is less than one or more of the threshold values.

3. The method of claim 2, further comprising disabling an active instruction data module when the current utilization level is less than the one or more threshold values.

4. The method of claim 2, further comprising disabling an active instruction data module when the current utilization level is less than the one or more threshold values, and the first trend and second trend are less than one or more threshold values.

5. The method of claim 1, wherein the distributing includes assigning portions of the work units to active instruction data modules having a current utilization level less than one or more of the threshold values.

6. The method of claim 1, wherein the distributing further includes enabling an inactive instruction data module.

7. The method of claim 6, further comprising assigning portions of the work units to the enabled instruction data module when the current utilization level of the active instruction data modules is greater than one or more of the threshold values.

8. The method of claim 7, wherein the distributing achieves full utilization of one or more of the enabled instruction data modules.

9. The method of claim 1, wherein the comparing includes counting instructions being executed within the active instruction data modules, the instructions being representative of the work units.

10. The method of claim 9, wherein the counting occurs over a predetermined period of time.

11. The method of claim 9, wherein the instructions include at least one of arithmetic logic unit (ALU) instructions and fetch instructions.

12. The method of claim 9, wherein the instructions include at least of Vector ALU, Scalar ALU, Texture Fetch, and local data store (LDS).

13. A non-transitory computer readable medium, storing instructions for execution by one or more processors to perform operations comprising:
- analyzing work units received by a processor;
- determining a current utilization level of active instruction data modules of a plurality of instruction data modules;
- determining a first trend based on wavefront counts of active instruction data modules;
- determining a second trend based on thread counts of the active instruction data modules;
- comparing the current utilization level of active instruction data modules with threshold values; and
- distributing the work units across selected ones of the plurality of instruction data modules based upon the analyzing, the current utilization level, the first trend, the second trend, and the comparing.

14. The non-transitory computer readable medium of claim 13, wherein the comparing includes determining whether the current utilization level is less than one or more of the threshold values.

15. The non-transitory computer readable medium of claim 14, further comprising disabling an active instruction data module when the current utilization level is less than the one or more threshold values.

16. The non-transitory computer readable medium of claim 14, further comprising disabling an active instruction data module when the current utilization level is less than the one or more threshold values, and the first trend and the second trend are less than one or more threshold values.

17. The non-transitory computer readable medium of claim 13, wherein the distributing includes assigning portions of the work units to active instruction data modules having a current utilization level less than one or more of the threshold values.

18. The non-transitory computer readable medium of claim 13, wherein the distributing further includes enabling an inactive instruction data module.

19. A system, comprising:
- an array of single instruction multiple data (SIMD) units configured for executing instructions; and
- a control module coupled to the array and configured to:
  - analyze a current utilization level of active SIMD units of the array of SIMD units;
  - analyze a first trend based on wavefront counts of the active SIMD units;
  - analyze a second trend based on thread counts of the active SIMD units; and
  - assign instructions to select ones of the array of SIMD units based upon the analyzed current utilizationas level, the first trend, and the second trend.

20. The system of claim 19, wherein a SIMD includes a sequencer configured to assign the instructions to particular modules within the SIMD; and
wherein each, sequencer is coupled to the control module.

21. The system of claim 20, further comprising one or more interpolator modules coupled to the control module for managing the instructions within the system.

* * * * *

UNITED STATES PATENT AND TRADEMARK OFFICE
CERTIFICATE OF CORRECTION

| | | |
|---|---|---|
| PATENT NO. | : 8,736,619 B2 | Page 1 of 1 |
| APPLICATION NO. | : 12/839962 | |
| DATED | : May 27, 2014 | |
| INVENTOR(S) | : Shah et al. | |

It is certified that error appears in the above-identified patent and that said Letters Patent is hereby corrected as shown below:

In the Claims:

Column 12

Line 28 please replace "utilizationas" with --utilization--.

Column 12

Line 33 please replace "each, sequencer" with --each sequencer--.

Signed and Sealed this
Seventh Day of October, 2014

Michelle K. Lee
*Deputy Director of the United States Patent and Trademark Office*